Oct. 25, 1932.  C. R. MABEE  1,884,779
MANUFACTURE OF LIVESTOCK FEEDS
Filed Aug. 10, 1925
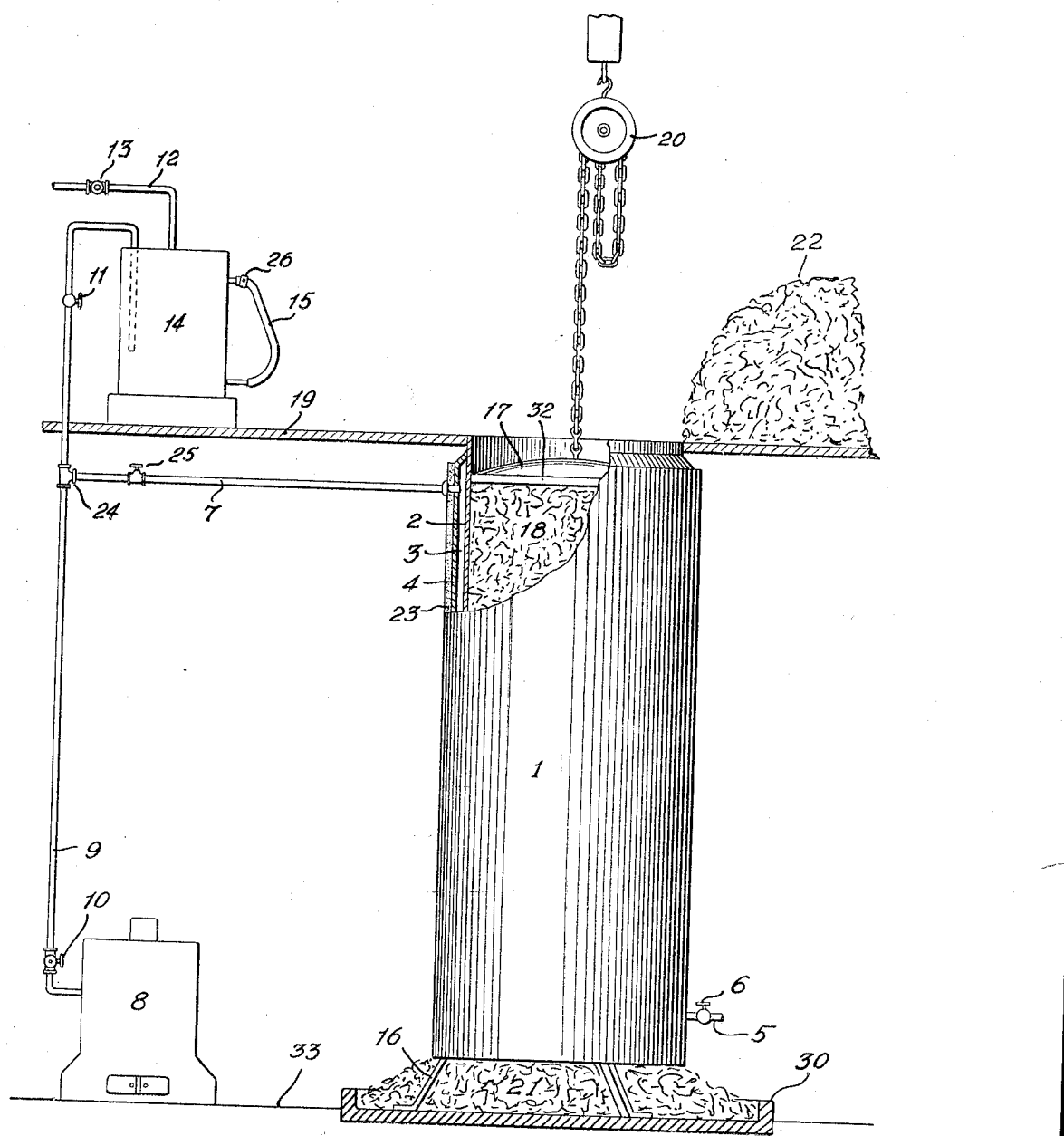
INVENTOR
CHARLES R. MABEE
BY
Mayer, Warfield & Watson
ATTORNEY Patented Oct. 25, 1932

1,884,779

UNITED STATES PATENT OFFICE

CHARLES R. MABEE, OF BUFFALO, NEW YORK, ASSIGNOR, BY MESNE ASSIGNMENTS, TO CHARLES H. DONALDSON, OF BUFFALO, NEW YORK

MANUFACTURE OF LIVESTOCK FEEDS

Application filed August 10, 1925. Serial No. 49,236.

This invention relates to the manufacture of feeding materials, particularly such materials as are suitable for use in live stock feeding.

An object of the invention is to provide a simple and efficient apparatus for the treatment of farm roughage, for example, hay, various kinds of fodder, stover, etc., in such a manner as to enhance the palatability and feeding value thereof.

Other objects of the invention will be in part obvious and will in part appear hereinafter.

This application is in part a continuation of my co-pending application for improvements in the manufacture of live stock feeds filed January 14, 1921, Serial No. 437,308, issued January 18, 1927, as Patent No. 1,615,024.

I have found that when comminuted farm roughage, that is hay, various kinds of fodders, straw, etc., either alone or combined with cereal materials is subjected in the presence of moisture in an amount sufficient to thoroughly dampen such material at a temperature slightly above ordinary temperatures and in a compressed condition to the action of a ferment, which may be such ferment or ferments as are inherently present in the material and/or ferments present in or produced from other materials such as, for example, malt diastase and yeast, live stock feeding materials are produced in a form or condition in which they are readily assimilated. Further, these materials are adapted for use either alone or in combination with other feeding materials such as grains, oil meals, etc.

When the usual farm roughage is comminuted or shredded, a cubic foot in a non-compressed condition will weigh from about two to six pounds. Accordingly, when in this condition, they require for retention a relatively larger container than would be required should the comminuted material be subjected to pressure, for example, a pressure sufficient to compress from 10 to 20 pounds into one cubic foot of space.

By compressing the roughage as by the application of pressure or simply by packing into a container, the volume of space required for the materials is reduced to about one-fourth of that which would be required were no pressure exerted; the amount of heat required to maintain a given temperature, radiation being considered, is reduced by about 70%; the amount of moisture required to maintain a given degree of humidity is reduced by approximately 75%, and a more rapid fermentation ensues in that the ferment and the materials are brought into more intimate contact.

The comminuted vegetable material or roughage may be compressed into a suitable container by any convenient method and may be combined or impregnated with a ferment or ferments introduced while in either a dry or in a liquid state or suspended in air, and the impregnation may take place either before, after or during the period at which the material is undergoing treatment under the influence of heat, moisture and pressure. The fermentative activity may be accelerated by an addition to the comminuted roughage of auxiliary or readily fermentable nutrients, as rye, barley, corn, middlings and leguminous vegetation, which may be in a partially fermented and preferably finely ground condition.

When treating dry vegetable material containing large amounts of fibre, it may be found advantageous to subject the materials to a preliminary treatment in the presence of water, sufficient to have the material well wetted at a temperature above the boiling point of water, and thereafter suitably reducing the temperature. By means of this treatment the fibrous material is opened up or rendered more porous and hence more readily accessible for action thereon by the ferment. This preliminary step, while desirable in some instances, is not a necessary preparatory step, for the process may be carried out at any temperature and terminated after the material has been subjected for a suitable period to the action of a ferment under the influence of heat in the presence of moisture and while under continuous or intermittent pressure or compressed in a container by other suitable means.

For a fuller understanding of the nature and objects of the invention, reference should be had to the following detailed description taken in connection with the accompanying drawing in which is shown a longitudinal section, partly broken away, of an apparatus suitable for the practice of my invention.

This apparatus comprises in combination a container 1 which is substantially open at both ends and mounted upon a support 16. The wall 2 of the container is surrounded by an annular space 3 serving as a jacket, the outer wall 4 of which is covered with an insulating material 23. The upper portion of the container lies in a plane substantially that of a mow floor 19, and the lower portion rests upon a feeding floor 33.

A means for increasing the temperature of a liquid, as a hot water heater 8, is connected by a pipe 9 with a reservoir 14, which reservoir may be supported by a mow floor. The pipe 9 is provided with regulating valves 10 and 11, and between these valves at 24 is a pipe 7, provided with a regulating valve 25. The outer extremity of this pipe is connected with the annular space. An outlet pipe 5 is provided in the lower outer wall, said pipe having a regulating valve 6 for controlling the flow of a heating medium, which may be introduced into the annular space. Positioned above the reservoir is a pipe 12 having a valve 13 and connected with a suitable water supply. A hose 15 is connected at the lower portion of the reservoir, the upper end being loosely held by a clamp 26.

Positioned above the upper end of the container is a hoist 20, for moving a cover weight 17 vertically within the container and adjacent to the walls thereof. The cover weight when lowered acts in a manner to substantially close the upper end of the container and it may be of any material, but it has been found to be advantageous to have part 32 which rests upon the vegetable material, composed of a material which does not readily transfer heat. Wood is a satisfactory insulating material to attach to a casting or steel plate in the fabrication of the cover weight. Weights weighing from 10 pounds per square foot to 120 pounds per square foot have been used. It has been observed that when the materials are moist and heated they enter into a very compact form which enables them to retain heat, and further that heat is generated in the materials much faster with a heavy cover weight than with a light one. An elevation 30 attached to the feeding floor prevents liquid materials from flowing over the floor and it may be of circular form about the lower end of the container.

The quantity of material treated will be determined by the size of the container, and this in turn by the number of animals to be fed; thus the container, for example, may vary from 3′ 3″ by 1′ to 13′ by 3′ 2″, the charge of vegetable material from 50 pounds to 5700 pounds, the ferment infusion from 64 pounds to 6125 pounds (which infusion may be prepared by treating from 1 to 57 pounds of ferment-containing material at a temperature from about 100° F. for yeast to 160° F. for diastase and inherent ferments), the period of treatment from 12 to 36 hours, and the pressure such that 1 cubic foot shall contain from 10 to 20 pounds of comminuted vegetable material.

As an illustrative embodiment of a manner for carrying the invention into practical effect, the following is given, based upon the utilization of a container 11′ high and 3′ 2″ in diameter. Heat about 1875 pounds of water to a temperature of approximately 175° F., after which the water is transferred from the heater 8 through pipe 9 into the infusion reservoir; valves 10, 11 and 25 being suitably adjusted. In consequence of passage through the pipe and of heating the walls of the reservoir, the temperature of the water is reduced to about 170° F. The temperature of the water in the reservoir may be regulated by means of supply pipe 12, through which a desired cooling medium may be admitted.

The cover weight which may weigh about 1250 pounds, is elevated above the upper end of the container and about 1500 pounds coarse comminuted vegetable materials are introduced through alternate raising and lowering of the cover weight. The upper end of the container may, if deemed advantageous, be elevated above the level of the mow floor, although in ordinary practice on a farm, it is found more satisfactory to have the same lie in a plane substantially that of the mow floor. When the container is filled 15 pounds of malt diastase in the form of ground barley malt may be introduced into the reservoir. The mixture of malt and hot water may be agitated until the soluble portions of the malt are dissolved. The infusion of malt is then allowed to flow over the upper portion of the vegetable material and to gradually percolate down through so that the materials are heated and moistened.

The amount of moisture varies with the character of the vegetable material, but in no case is there a sufficient addition to submerge the vegetable material. The temperature of the infusion containing the ferment is usually from 155° F. to 170° F., at the time it is poured over the vegetable materials. In the winter a higher temperature may be found necessary than during the summer, as greater portions of the heat will be required to bring the vegetable materials and the container to the proper temperature. However, where the container is at all times partly filled with material, the temperature of the infusion need not be as high as where the container entirely empty and refilled. The temperature of the feeding stuff is about 140° F., the heat being imparted by the infusion.

The cover weight is then lowered by means of the hoist until it rests upon the upper portion of the vegetable materials, as shown at 18, in the broken-away section of the container. The vegetable materials may remain in the container and at a malting temperature of about 140° F. for about 16 to 24 hours, after which they may be removed in a warm, moist condition having a decided aromatic odor.

It is preferable to have the jacket surrounding the container heavily insulated over its outer wall. This insulation of the outer wall may be accomplished by applying about 1" of asbestos.

In the warmer months, in order to prevent circulation through the jacketed space, the valves 25 and 6 should be closed, thus enabling the jacket to act in an insulating capacity. During the winter, these valves are so regulated as to admit a heating medium to the jacket and maintain a temperature within the container approximating 140° F.

The vegetable materials may be tightly pressed into the container and then covered by any suitable means, preferably insulated, or the upper portion of the container may be so covered without departing from the invention, it being considered that the materials are moistened with an infusion containing a ferment and that the heat is maintained at a suitable temperature.

The feeding stuffs at the lower end of the container are so compact that they support themselves and do not rest upon the feeding floor, except when materials are introduced into an empty container. The feeding stuffs consequently substantially close the lower end of the container, retaining the heat in the major portion of the materials to the same except approximately as though the lower end of the container were positively closed. The duration of retention of the vegetable materials within the container depends upon the nature of those materials, the length of the individual particles and the extent desired of the conversion of starches and cellulose into sugars and alcohol. In the event that the container is filled in one operation, the vegetable materials are introduced until the container is partly filled and dampened with the heated infusion. Additional materials are then introduced, packed tightly and moistened with the heated infusion, for the reason that unless the container is small and shallow, it is more satisfactory to heat and moisten the material in layer form as it is introduced into the container. The character of the feeding stuffs is materially improved by the action of ferments upon both coarse and cereal feeds, particularly cereal feeds containing starches, and I have found that this action may be preserved at higher temperatures where the materials are not submerged in liquid than where the materials are submerged.

Further, the method may be carried out in a manner which may be termed a "semi-continuous process", that is, the dry roughage to be treated is handled progressively. As the treated roughage is removed from the container by any desired means, sufficient additional material is introduced into the container and properly moistened and treated so that at all times the process continues with the container substantially filled with the vegetable material. This mode of operation effects expediency and efficiency in the production of the feed stocks.

The process may also be conducted by what may be called a "batch procedure", that is, the container, entirely empty, is completely filled with the vegetable material at a given operation. When the vegetable material is sufficiently treated, it is removed in its entirety, the container then being refilled and the operation repeated.

In farm practice, where the period of treatment is not essentially an important factor and where the feeding materials are utilized, it may be said at the point of manufacture, the process may be carried out successfully by a slow treatment and without subjecting the materials to a temperature much greater than atmospheric temperatures. By practicing this slow process, which entails the lengthening of the treatment at a temperature materially below the boiling point of water, there is obtained substantially the same results as are obtained by higher temperatures used for a relatively shorter time. In the slow process as well as in the process hereinbefore referred to, the inherent ferments, although it is not necessary, may have their action augmented by the use of auxiliary ferments, such as those which have previously been mentioned, by admixing such auxiliary ferments with the dry comminuted roughage prior to, at the time of, or after its introduction into the container. It will, of course, be understood that the activity and vitality of the ferment is not to be inhibited by the use of too high temperatures.

This fermentative treatment which may be applied as continuous, semi-continuous, batch and quick or slow process, through the action of a ferment as diastase, yeast, etc., promotes the development of enzymes when commingled with the materials which are to be utilized for feeding purposes. The starch and perhaps a part of the cellulose present in the materials undergoing treatment may be under suitable temperature conditions, in whole or in part, converted into less complex carbohydrates of a sugary character. The value of the feeding materials is enhanced by the addition of these digestive agents, and the enzymes produced thereby.

As an incidental advantage of the process, due to the use of materially less water or moisture than would be required should the comminuted material be treated without compression, the necessity of removing the excess water from the mass, as by evaporation, is avoided. The soluble ingredients are released from the container in conjunction with the insoluble material in a comparatively dry state without loss of nutrient value.

Where a batch method of processing is employed, the mass may be dried within the container or allowed to escape therefrom in a relatively moist condition.

It has been pointed out that the roughage contains inherent ferments which in themselves will produce desirable chemical changes without the aid of extraneous ferments, and it will, of course, be understood therefore that the invention is not confined to a combining of extraneous ferments with the material undergoing treatment, particularly in such case where the materials are compressed and treated in a slightly heated and moistened condition.

Since certain changes in the constructions above set forth, which embody the invention may be made without departing from its scope, it is intended that all matter contained in the above description or shown in the accompanying drawing shall be interposed as illustrative and not in a limiting sense.

Having described my invention, what I claim as new and desire to secure by Letters Patent, is:

1. In an apparatus for the processing of farm roughage, a vertical container formed with substantially open upper and lower ends, and means to support said container on a floor with said lower end in spaced relation to said floor, said supporting means being so arranged as not substantially to interfere with the withdrawal of processed materials from beneath said container, and the cross-sectional area at the lower end of said container being at least as great as the cross-sectional area at any plane above the same.

2. In an apparatus for the processing of farm roughage, a container arranged with an open end at the base thereof, means to support said container in spaced relation to a floor, and a continuous wall extending upwardly from said floor and forming a basin adjacent said opening, the cross-sectional area at the lower end of said container being at least as great as the cross-sectional area at any plane above the same.

3. Apparatus for the treatment of farm roughage comprising a vertical container formed with side walls, the upper and lower ends and the interior of the container being unrestricted to permit roughage to be readily introduced into the top thereof, to move freely downwardly therethrough, and to be withdrawn from beneath the bottom thereof, the cross-sectional area at the lower end of said container being at least as great as the cross-sectional area at any plane above the same.

4. Apparatus for the treatment of farm roughage comprising a vertical container formed with side walls and with open upper and lower ends, and means to support said container in position to permit the withdrawal of treated roughage from beneath all sides of the open lower end of the container, the cross-sectional area at the lower end of said container being at least as great as the cross-sectional area at any plane above the same.

5. Apparatus for the treatment of farm roughage comprising a vertical container formed with side walls and with open upper and lower ends, the cross-sectional area at the lower end of said container being at least as great as the cross-sectional area at any plane above the same, means to support said container in position to permit the withdrawal of treated roughage from beneath all sides of the open lower end of the container, and means to press material in the container toward and out of the lower end thereof.

6. Apparatus for the treatment of farm roughage comprising a vertical container formed with side walls and open at its upper and lower ends, the lower end being supported in spaced relationship to a floor to permit the withdrawal of treated roughage therefrom, and the upper end lying in a plane substantially that of a mow floor to permit the ready introduction of roughage therein, and the cross-sectional area at the lower end of said container being at least as great as the cross-sectional area at any plane above the same.

7. Apparatus for the treatment of farm roughage comprising a vertical container formed with side walls and open at its upper and lower ends, the lower end being supported in spaced relationship to a floor to permit the withdrawal of treated roughage therefrom, and the upper end lying in a plane substantially that of a mow floor to permit the ready introduction of roughage therein, the cross-sectional area at the lower end of said container being at least as great as the cross-sectional area at any plane above the same, and means for compressing the roughage in said container.

8. Apparatus for the conversion of farm roughage comprising a container, an insulating envelope in spaced relation to certain of the walls of said container, and means to introduce a heating fluid into the space between the said container and said envelope, said container being formed with open upper and lower ends to permit the introduction of farm roughage into the top thereof and the withdrawal of treated roughage at the base thereof in a continuous manner.

9. Apparatus for the treatment of farm roughage, comprising a vertical container formed with side walls, the upper and lower ends and the interior of the container being unrestricted to permit roughage to be readily introduced into the top thereof, to move freely downwardly therethrough, and to be withdrawn from beneath the bottom thereof, and means to supply heat to said container.

10. Apparatus for the treatment of farm roughage, comprising a vertical container formed with side walls and with open upper and lower ends, means to support said container in position to permit the withdrawal of treated roughage from beneath all sides of the open lower end of the container, means to press material in the container toward and out of the lower end thereof, and means to supply heat to said container.

11. In apparatus for the processing of farm roughage, a container having an open lower end the cross-sectional area of which is at least as great as the cross-sectional area throughout the length of said container, and means to supply heat to said container.

12. Apparatus for the continuous treatment of farm roughage, comprising a vertical container formed with side walls, the upper and lower ends and the interior of the container being unrestricted to permit roughage to be readily introduced into the top thereof, to move freely downwardly therethrough, and to be withdrawn from beneath the bottom thereof, the cross-sectional area of the container being substantially the same at all points throughout its length.

In testimony whereof I affix my signature.

CHARLES R. MABEE.